(12) United States Patent
Kwon et al.

(10) Patent No.: US 8,463,262 B2
(45) Date of Patent: Jun. 11, 2013

(54) METHOD FOR RECEIVING CONTROL INFORMATION IN WIRELESS COMMUNICATION SYSTEM AND APPARATUS THEREFOR

(75) Inventors: Yeong Hyeon Kwon, Gyeonggi-do (KR); So Yeon Kim, Gyeonggi-do (KR); Jae Hoon Chung, Gyeonggi-do (KR); Hyun Woo Lee, Gyeonggi-do (KR); Seung Hee Han, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 203 days.

(21) Appl. No.: 13/123,988

(22) PCT Filed: Dec. 2, 2009

(86) PCT No.: PCT/KR2009/007163
§ 371 (c)(1),
(2), (4) Date: Apr. 13, 2011

(87) PCT Pub. No.: WO2010/064847
PCT Pub. Date: Jun. 10, 2010

(65) Prior Publication Data
US 2011/0201333 A1    Aug. 18, 2011

(51) Int. Cl.
*H04W 4/00* (2009.01)
(52) U.S. Cl.
USPC ........................................................ 455/434
(58) Field of Classification Search
USPC ................. 370/208, 329, 310, 260, 335, 241, 370/336, 252, 254, 315; 455/45, 423, 434, 455/507, 509, 68, 70
See application file for complete search history.

(56) References Cited

U.S. PATENT DOCUMENTS

| | | | |
|---|---|---|---|
| 8,031,583 B2 * | 10/2011 | Classon et al. | 370/208 |
| 2006/0203820 A1 | 9/2006 | Coluccio | |
| 2007/0190967 A1 | 8/2007 | Cho et al. | |
| 2008/0225786 A1 * | 9/2008 | Han et al. | 370/329 |
| 2008/0232322 A1 | 9/2008 | Heo et al. | |

OTHER PUBLICATIONS

International Search Report from PCT/KR2009/007163.

* cited by examiner

*Primary Examiner* — Kiet Doan
(74) *Attorney, Agent, or Firm* — Morgan, Lewis & Bockius LLP

(57) ABSTRACT

A method of receiving a control signal by a user equipment in a wireless communication system is disclosed. The present invention includes receiving control regions including the control channel relevant to each of a plurality of component carriers via a plurality of component carriers and detecting the control channel for the user equipment by performing blind decoding by a unit of CCE (control channel element) aggregated at a preset level in a search space included in the control regions. And, start positions of the search spaces in the plurality of component carriers is in a certain relationship. Moreover, the preset level is identically set for each of the plurality of component carriers.

4 Claims, 20 Drawing Sheets

(a) Control-plane protocol stack (b) User-plane protocol stack (a) 1 or 2 TX case (b) 4 TX case CCE Index

METHOD FOR RECEIVING CONTROL INFORMATION IN WIRELESS COMMUNICATION SYSTEM AND APPARATUS THEREFOR

The present application is a national stage of PCT International Application No. PCT/KR2009/007163, filed Dec. 2, 2009, and claims the benefit of U.S. Provisional Application No. 61/119,733, filed Dec. 4, 2008.

TECHNICAL FIELD

The present invention relates to a wireless communication system, and more particularly, to a method for receiving a control signal in a user equipment of a carrier aggregation applied wireless communication system and apparatus therefor.

BACKGROUND ART

First of all, in the following description, 3GPP LTE (3rd generation partnership projecting long term evolution, hereinafter abbreviated LTE) is schematically explained as an example of a mobile communication system to which the present invention is applicable.

FIG. 1 is a schematic diagram of E-UMTS network structure as an example of a mobile communication system. E-UMTS (evolved universal mobile telecommunications system) is the system evolved from a conventional UMTS (universal mobile telecommunications system) and its basic standardization is ongoing by 3GPP. Generally, E-UMTS can be called LTE (long term evolution) system. For the details of the technical specifications of UMTS and E-UMTS, Release 7 and Release 8 of '3rd Generation Partnership Project: Technical Specification Group Radio Access Network' can be referred to.

Referring to FIG. 1, E-UMTS consists of a user equipment (UE), base stations (eNode B: eNB) 110*a* and 110*b* and an access gateway (AG) provided on an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for user or control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

Recently, standardization of next technology for LTE is ongoing to be established by 3GPP. In this specification of the present invention, the next technology shall be named 'LTE-Advanced' or 'LTE-A'. One major difference between the LTE system and the LTE-A system is a system bandwidth difference. The LTE-A system has a target to support a broadband of maximum 100 MHz. For this, the LTE-A system uses carrier aggregation or bandwidth aggregation to achieving a broadband using a plurality of component carriers. The carrier aggregation enables a plurality of component carriers to be used as one large logic frequency band to use a wider frequency band. A bandwidth of each component carrier can be defined based on a system block used by the LTE system. Each component carrier is transmitted using a component carrier. In this specification, a component carrier can mean a component carrier for the carrier aggregation or a center carrier of a component carrier according to a context and can use the center carrier together with the component carrier.

DISCLOSURE OF INVENTION

Technical Problem

An object of the present invention is to provide a method for receiving control information in wireless communication system and an apparatus therefor. It is to be understood that technical problems to be solved by the present invention are not limited to the aforementioned technical problems and other technical problems which are not mentioned will be apparent from the following description to the person with an ordinary skill in the art to which the present invention pertains.

Solution to Problem

Accordingly, the present invention is directed to a method for receiving a control signal in a user equipment of a carrier aggregation applied wireless communication system and apparatus therefor that substantially obviate one or more of the problems due to limitations and disadvantages of the related art.

An object of the present invention is to provide a method for receiving a control signal in a carrier aggregation applied wireless communication system using a plurality of component carriers and apparatus therefore.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of detecting a control channel by a user equipment in a wireless communication system, includes the steps of receiving control regions including the control channel relevant to each of the plurality of component carriers via the plurality of component carriers and detecting the control channel by performing blind decoding by a unit of CCE (control channel element) aggregated at a preset level in a search space included in the control regions.

Preferably, a start position of the search space is set by a certain scheme according to the plurality of component carriers.

Preferably, the control channel detecting step includes the steps of performing the blind decoding for a reference component carrier among the plurality of component carriers and performing the blind decoding for the rest of the plurality of component carriers except the reference component carrier, In this case, the blind decoding is performed for the rest of the plurality of component carriers except the reference component carrier using a search space having a size smaller than that of a search space successfully decoded for the reference component carrier.

Preferably, the preset level is identically set for each of a plurality of component carriers.

To further achieve these and other advantages and in accordance with the purpose of the present invention, a method of detecting a control channels by a user equipment in a wireless communication system, includes the steps of receiving a control region including control channels respectively relevant to the plurality of component carriers via one of the plurality of component carriers and detecting the control channels by performing blind decoding by a unit of CCE (control channel element) aggregated at a preset level in an extended search space included in the control region.

Preferably, the extended search space is formed by extending a size of a search space in a legacy system.

Preferably, the extended search space differs in size per corresponding aggregation level.

It is to be understood that both the foregoing general description and the following detailed description are exemplary and explanatory and are intended to provide further explanation of the invention as claimed.

Advantageous Effects of Invention

Accordingly, the present invention provides the following effects or advantages.

First of all, a user equipment (terminal) is able to efficiently receive a control signal in a wireless communication system having carrier aggregation applied thereto.

Effects obtainable from the present invention are non-limited the above mentioned effect. And, other unmentioned effects can be clearly understood from the following description by those having ordinary skill in the technical field to which the present invention pertains.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Reference will now be made in detail to the preferred embodiments of the present invention, examples of which are illustrated in the accompanying drawings. The embodiments described in the following description include the examples showing that the technical features of the present invention are applied to 3GPP system.

In the following description, a system, of which system band uses a single component carrier, is named a legacy system or a narrowband system. On the contrary, a system, of which system band includes a plurality of component carriers and uses at least one component carrier as a system block of a legacy system, is named an evolved system or a wideband system. A component carrier used as a legacy system block has the same size of a system block of a legacy system. Yet, sizes of the rest of the component carriers are specifically non-limited. For system simplification, it is able to determine the sizes of the rest of the component carriers based on the system block size of the legacy system as well. For instance, 3GPP LTE (Release-8) system ad 3GPP LTE-A (Release-9) system are related to a legacy system and an evolved system, respectively.

Based on the above definitions, the 3GPP LTE (Release-8) system is named an LTE system or a legacy system in the present specification. And, a user equipment supporting the LTE system is named an LTE user equipment or a legacy user equipment. On the contrary, the 3GPP LTE-A (Release-9) system is named an LTE-A system or an evolved system. Moreover, a user equipment supporting the LTE-A system is named an LTE-A user equipment or an evolved user equipment.

For clarity and convenience, although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modified and applicable to H-FDD or TDD scheme.

Figure 1:
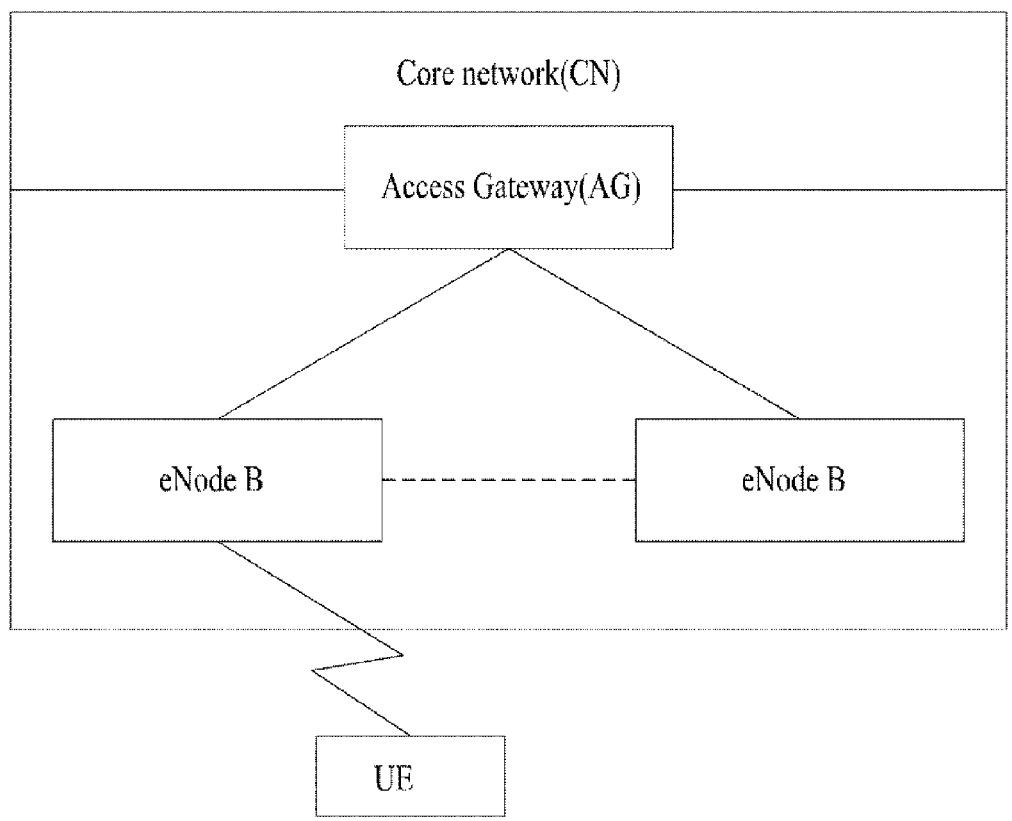
FIG. 1 is a schematic diagram of E-UMTS network structure as an example of a mobile communication system.
Figure 2:
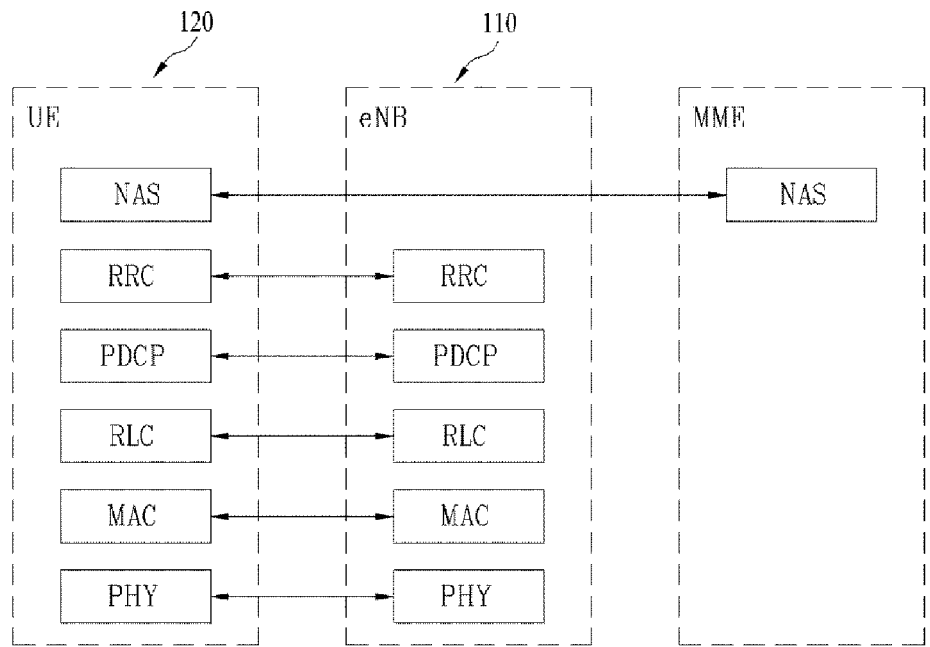
FIG. 2 is a diagram of structures of control and user planes of a radio interface protocol between a user equipment and E-UTRAN based on 3GPP radio access network specification.
Figure 2:
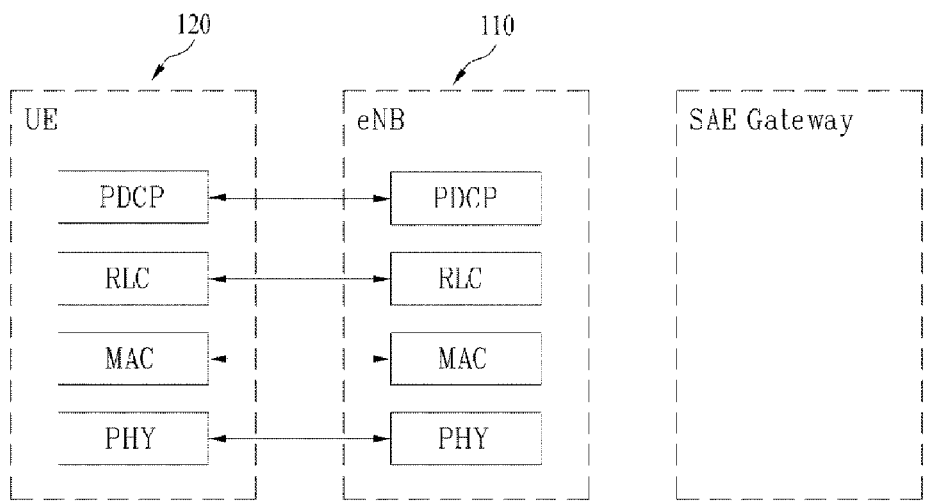

FIG. 2 is a diagram of structures of control and user planes of a radio interface protocol between a user equipment and E-UTRAN based on 3GPP radio access network specification. First of all, a control plane means a passage for transmitting control messages used by a user equipment and a network to mange a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer o the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network. If the RRC layers of the user equipment and network are RRC-connected to each other, the user equipment enters an RRC connected mode. Otherwise, the user equipment enters an RRC idle mode. An NAS (non-access stratum) layer above the RRC layer performs functions of session management, mobility management and the like.

One cell constructing a base station (eNB) is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via downlink SCH or a separate downlink multicast channel (MCH). Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 3:
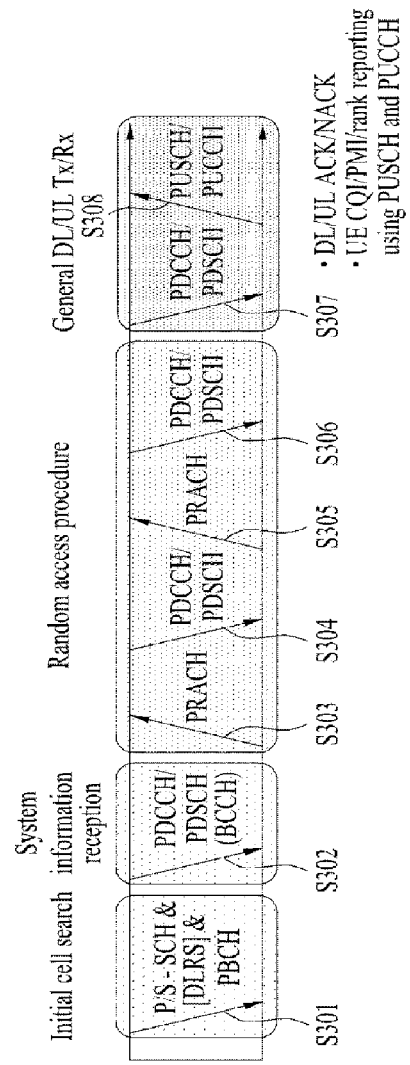
FIG. 3 is a diagram for explaining physical channels used for 3GPP system and a general method of transmitting a signal using the same.

FIG. 3 is a diagram for explaining physical channels used for 3GPP system and a general method of transmitting a signal using the same.

Referring to FIG. 3, if a power is turned on or a user equipment enters a new cell, the user equipment performs an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. For this, the user equipment transmits a specific sequence as a preamble via a physical random access channel (PRACH) [S303 and S305] and is then able to receive a response message via PDCCH and a corresponding PDSCH in response to the preamble [S304 and S306]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. Control information transmitted/received in uplink/downlink to/from the base station by the user equipment includes ACK/

NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 4:
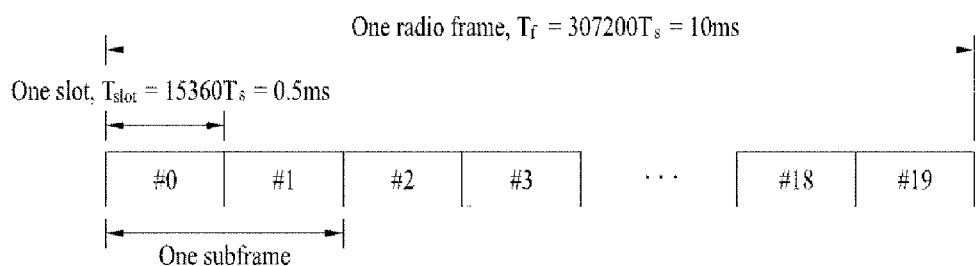
FIG. 4 is a diagram for an example of a structure of a radio frame used for LTE system.

FIG. 4 is a diagram for an example of a structure of a radio frame used for LTE system.

Referring to FIG. 4, a radio frame has a length of 10 ms (327200×Ts) and is constructed with 10 subframes in equal size. Each of the subframes has a length of 1 ms and is constructed with two slots. Each of the slots has a length of 0.5 ms (15360×Ts). In this case, Ts indicates a sampling time and is expressed as Ts=1/(15 kHz×2048)=3.2552×10-8 (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

Figure 5:
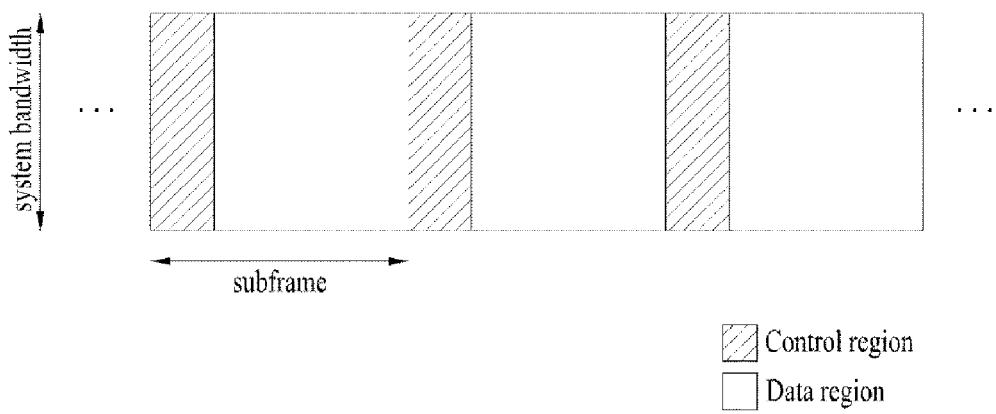
FIG. 5 is an exemplary diagram for a functional structure of a downlink radio frame.

FIG. 5 is an exemplary diagram for a functional structure of a downlink radio frame.

Referring to FIG. 5, a downlink radio frame includes 10 subframes, each of which has an equal length. In 3GPP LTE system, a subframe is defined by a basic time unit of packet scheduling for a whole downlink frequency. Each subframe is divided into an interval (control region) for scheduling transmission and other control channel transmission and an interval (data region) for downlink data transmission. The control region starts from a first OFDM symbol of a subframe and includes at least one or more OFDM symbols. A size of the control region can be independently set for each subframe. The control region is used in transmitting L1/L2 (layer 1/layer 2) control signal. And, the data region is used in transmitting downlink traffic.

Figure 6:
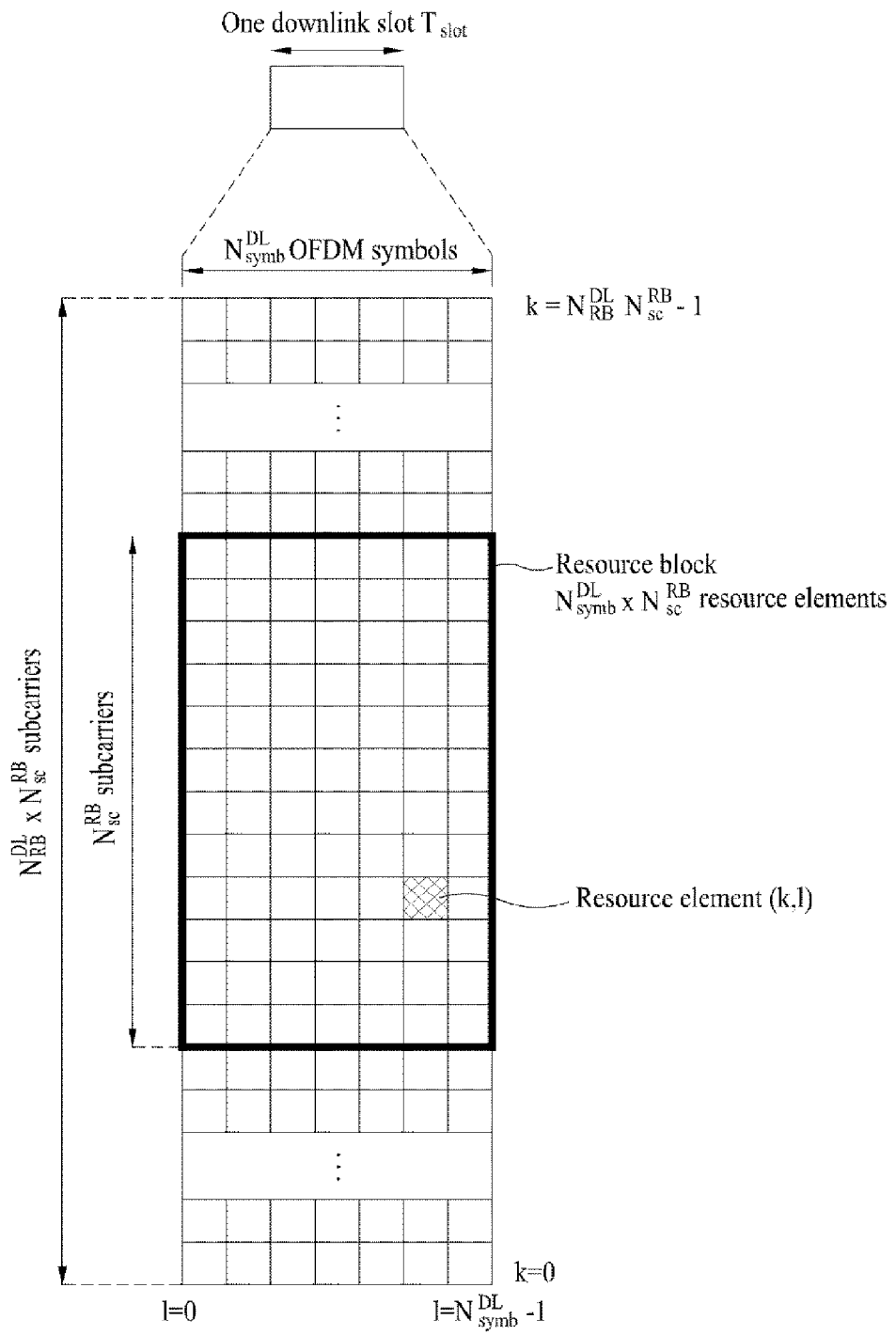
FIG. 6 is an exemplary diagram of a resource grid for a downlink slot.

FIG. 6 is an exemplary diagram of a resource grid for a downlink slot.

Referring to FIG. 6, a downlink slot includes $N^{DL}_{symb}$ OFDM symbols in a time domain and $N^{DL}_{RB}$ resource blocks in a frequency domain. Since each resource block includes $NRB^{RB}_{sc}$ subcarriers, a downlink slot includes $N^{DL}_{RB} \times NR$-$B^{RB}_{sc}$ subcarriers in the frequency domain. FIG. 6 shows that a downlink slot includes 7 OFDM symbols and that a resource block includes 12 subcarriers, by which the downlink slot is non-limited. For instance, the number of OFDM symbols included in a downlink slot can be modified according to a length of a cyclic prefix (CP).

Each element on a resource grid is named a resource element (RE). One resource element is indicated by one OFDM symbol index and one subcarrier index. One resource block (RB) is constructed with $N^{DL}_{RB} \times N^{RB}_{sc}$ resource elements (REs). The number ($N^{DL}_{RB}$) of resource blocks included in a downlink slot is dependent on a downlink transmission bandwidth set for a cell.

Figure 7:
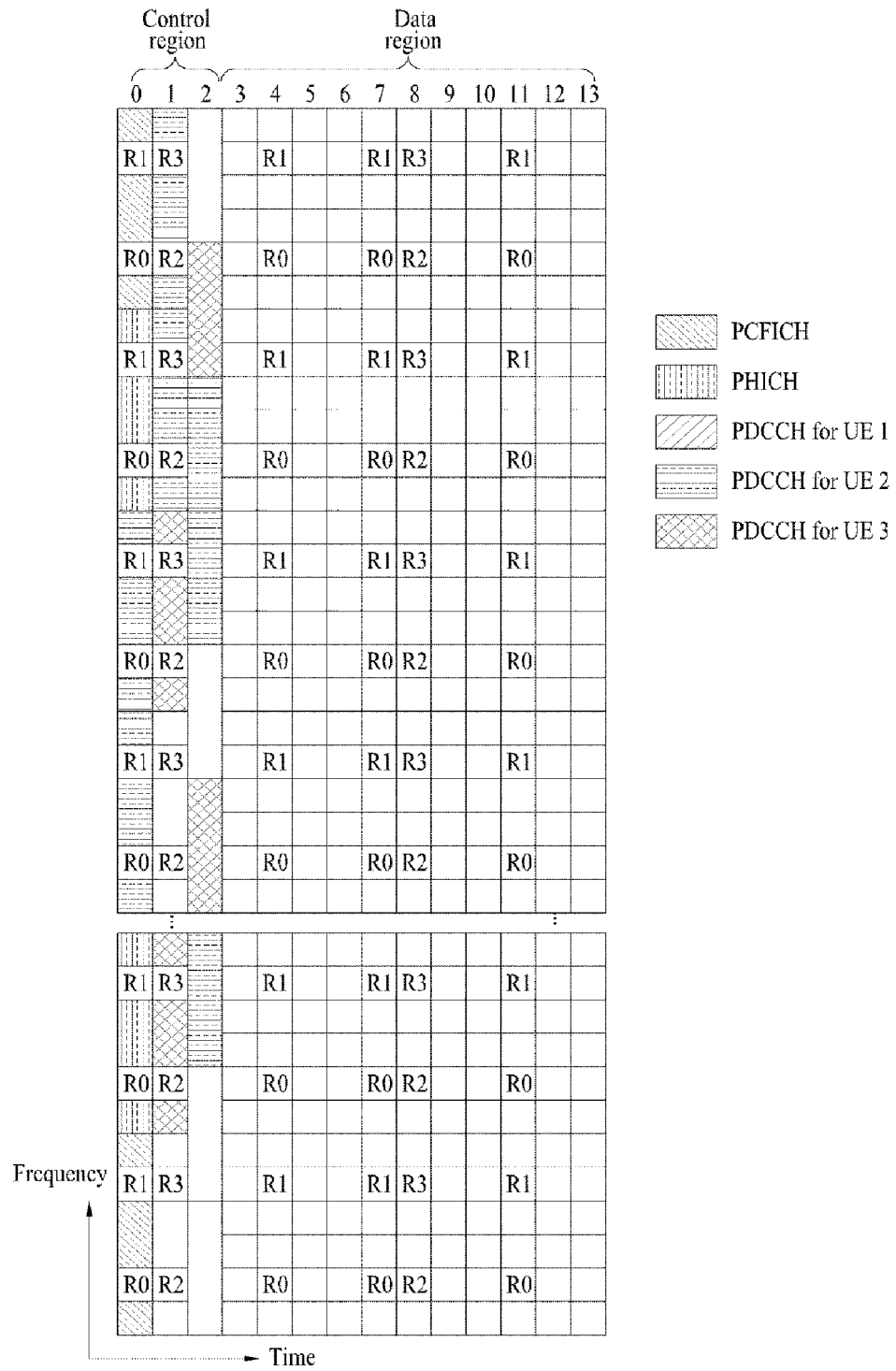
FIG. 7 is an exemplary diagram of a control channel included in a control region of a subframe.

FIG. 7 is an exemplary diagram of a control channel included in a control region of a subframe.

Referring to FIG. 7, a subframe is constructed with 14 OFDM symbols. According to the setting of the subframe, at least one of first to third OFDM symbols is used for a control region and the rest (13~11) of the OFDM symbols are used for a data region.

In FIG. 7, R1 to R4 indicate reference signals (RS) for antennas 0 to 3, respectively. The reference signal (RS) is fixed to a predetermined pattern within a subframe irrespective of the control region or the data region. A control channel is assigned to a resource failing to have the RS allocated thereto in the control region. And, a traffic channel is assigned to a resource failing to have the RS allocated thereto in the data region as well. Control channels assigned to the control region include PCFICH (Physical Control Format Indicator CHannel), PHICH (Physical Hybrid-ARQ Indicator CHannel), PDCCH (Physical Downlink Control CHannel), etc.

The PCFICH is a physical control format indicator channel informs a user equipment of the number of OFDM symbols used for PDCCH for each subframe. The PCFICH is located at a first OFDM symbol and is set prior to the PHICH and the PDCCH. The PCFICH is constructed with four resource element groups (REGs). Each of the REGs is dispersed within the control region based on a cell ID. One REG is constructed with four REs. REG structure will be described in detail with reference to FIG. 8. The PCFICH indicates a value of 1~3 and is modulated by QPSK (quadrature phase shift keying).

The PHICH is a physical HARQ indicator channel and is used in transmitting ACK/NACK for uplink transmission. The PHICH is constructed with 3 REGs and is cell-specifically scrambled. The ACK/NACK is indicated by 1 bit, is spread by 'SF (spreading factor)=2 or 4', and is repeated three times. A plurality of PHICHs can be mapped by the same resource. And, the PHICH is modulated by BPSK (binary phase shift keying).

The PDCCH is a physical downlink control channel and is assigned to first n OFDM symbols. In this case, 'n' is an integer equal to or greater than 1 and is indicated by the PCFICH. The PDCCH is constructed with at least one CCE. This will be explained in detail later. The PDCCH informs each user equipment or a user equipment group of information relevant to resource allocation of transport channels PCH (paging channel) and DL-SCH (downlink-shared channel), uplink scheduling grant, HARQ information and the like.

Yet, the PCH (paging channel) and DL-SCH (downlink-shared channel) are carried on the PDSCH. Therefore, a base station or a user equipment normally transmits or receives data via the PDSCH except specific control information or specific service data.

Information indicating that data of the PDSCH is transmitted to a prescribed user equipment (or a plurality of user equipments), information indicating how the user equipments receive and decode PDSCH data, and the like are transmitted by being included in the PDCCH. For instance, assume that a specific PDCCH is CRC masked with RNTI (radio network temporary identity) 'A' and that information on data transmitted using a radio resource 'B' (e.g., frequency location) and transmission format information 'C' (e.g., transport block size, modulation scheme, coding information, etc.) is transmitted via a specific subframe. If so, at least one user equipment located in a corresponding cell monitors PDCCH using RNTI information of its own. If there is at least one user equipment having the RNTI 'A', the user equipments receive the PDCCH and then receive PDSCH indicated by 'B' and 'C' through the information of the received PDCCH.

Figure 8:
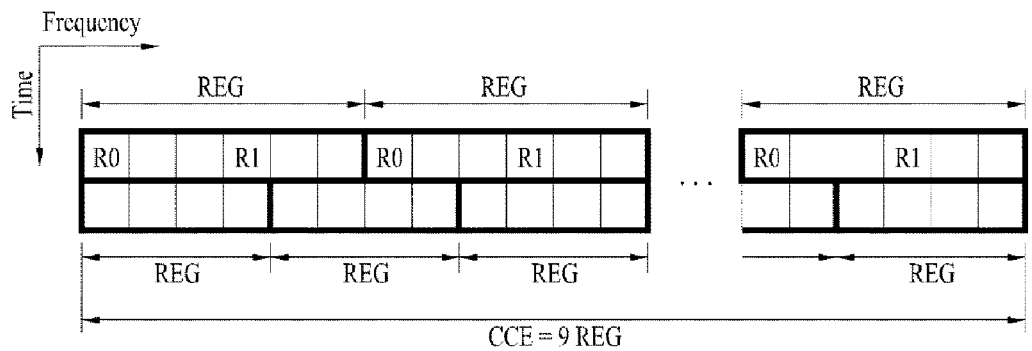
FIG. 8 is a diagram of a resource unit used in configuring a control channel.
Figure 8:
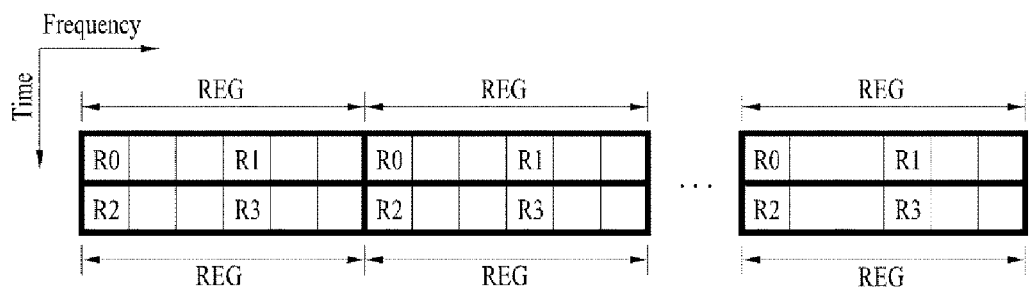

FIG. 8 (a) and FIG. 8 (b) show resource units used in configuring a control channel, respectively. Specifically, FIG. 8(a) shows a case that the number of transmitting antennas is 1 or 2. FIG. 8 (b) shows a case that the number of transmitting antennas is 4.

Referring to FIG. 8 (a) and FIG. 8 (b), a basic resource unit of a control channel is REG (resource element group). The REG includes four resource elements neighbor to each other while RS is excluded. The REG is represented as a bold line in the drawing. PCFICH includes 4 REGs and PHICH includes 3 REGs. PDCCH is configured by CCE (control channel element) unit. And, one CCE includes 9 REGs.

A user equipment is set to check M(L) (≧L) CCEs arranged consecutively or according to a specific rule in order to check whether PDCCH including L CCEs is transmitted to itself. A value of 'L', which should by considered for PDCCH reception by the user equipment, may be a plural value. CCE sets, which should be checked for the PDCCH reception by a user equipment, are called a search space. For instance, LTE system defines the search space by Table 1.

TABLE 1

| Type | Search space $S_k^{(L)}$ Aggregation level L | Size [in CCEs] | Number of PDCCH candidates $M^{(L)}$ | DCI formats |
|---|---|---|---|---|
| UE-specific | 1 | 6 | 6 | 0, 1, 1A, 1B, 2 |
| | 2 | 12 | 6 | |
| | 4 | 8 | 2 | |
| | 8 | 16 | 2 | |
| Common | 4 | 16 | 4 | 0, 1A, 1C, 3/3A |
| | 8 | 16 | 2 | |

In Table 1, CCE aggregation level L indicates the number of CCEs constructing PDCCH, $S_k^{(L)}$ indicates a size of a search space, and $M^{(L)}$ indicates the number of candidate PDCCH that should be monitored in the search space.

The search space can be divided into a UE-specific search space allowable for a specific user equipment to access and a common search space allowable for all user equipments within a cell. A user equipment monitors the common search space at L=4 and 8. The user equipment monitors the UE-specific search space at L=1, 2, 4 and 8. The common search space and the UE-specific search space can be overlapped with each other.

Moreover, a location of a first CCE (having a smallest index) in a PDCCH search space given to a random user equipment for each L value varies for each subframe according to a user equipment. This is called PDD search space hashing.

Figure 9:
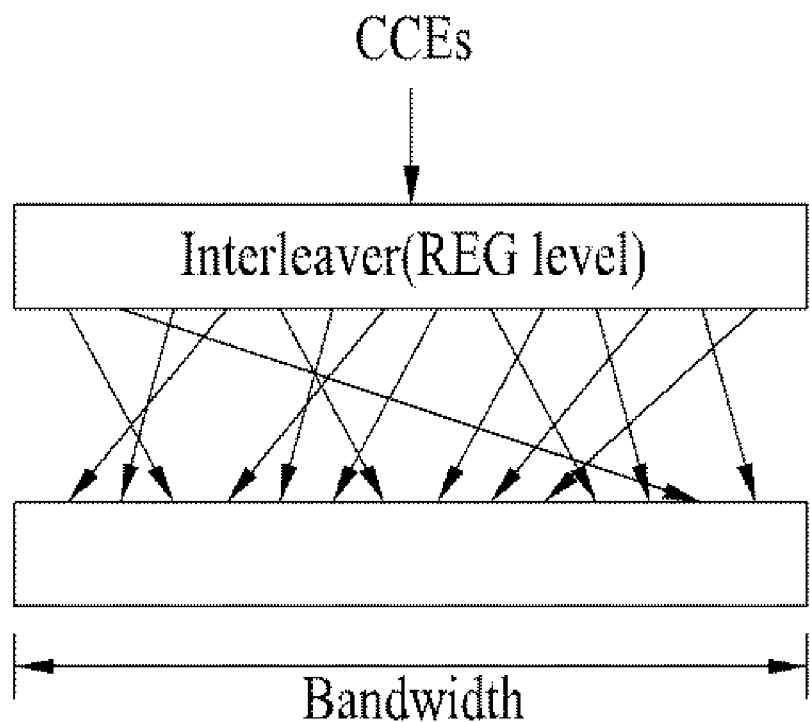
FIG. 9 is an exemplary diagram for CCE dispersion on s system band.

FIG. 9 shows an example for dispersing CCEs on a system band. Referring to FIG. 9, a plurality of logically consecutive CCEs are inputted to an interleaver. The interleaver performs a function of mixing a plurality of the inputted CCEs with each other by REG unit. Hence, frequency/time resources constructing one CCE are distributed in a manner of being physically scattered on a whole frequency/time domain within a control region of a subframe. Although a control channel is constructed by CCE unit, interleaving is performed by the REG unit. Therefore, it is able to maximize frequency diversity and interference randomization gain.

Figure 10:
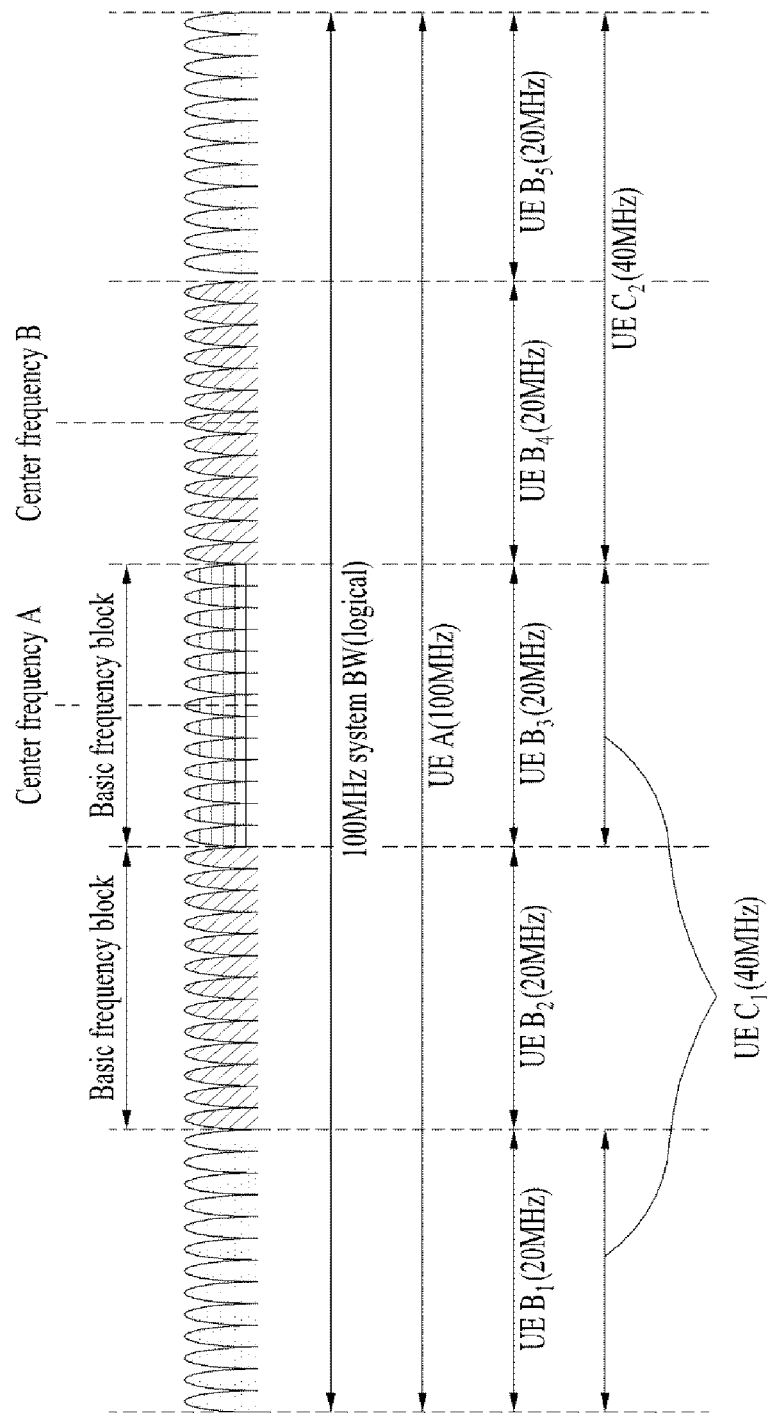
FIG. 10 is a conceptional diagram for explaining carrier aggregation.

FIG. 10 is a conceptional diagram for explaining carrier aggregation. The carrier aggregation means a method of using a plurality of component carriers as one large logical frequency band to enable a wireless communication to use a wider frequency band.

Referring to FIG. 10, a whole system bandwidth (system BW) is a logical band and has a bandwidth of 100 MHz. The whole system BW includes 5 component carriers. And, each of the component carriers has a bandwidth of 20 MHz. The component carrier includes at least one or more physically consecutive subcarriers. Although each of the component carriers is assumed as having the same bandwidth, the component carriers can differ from each other in size. Although the drawing shows that the component carriers are neighboring to each other in a frequency domain, it just represents the logical concept. Hence, the component carriers can be located in a manner of being physically adjacent to or separate from each other.

A center frequency is used different for each of the component carriers. Alternatively, it is bale to use one center carrier in common to component carriers physically adjacent to each other. For instance, assuming that all component carriers are physically adjacent to each other, it is able to use a center carrier 'A'. Assuming a case that component carriers are not physically adjacent to each other, it is able to use a center carrier 'A' for one component carrier, a center carrier 'B' for another component carrier, and the like.

In this specification, a component carrier may correspond to a system bandwidth of a legacy system. By defining a component carrier with reference to a legacy system, it is able to facilitate provision of backward compatibility and system design in a wireless communication environment in which an evolved user equipment and a legacy user equipment coexist. For instance, in case that LTE-A system supports carrier aggregation, each component carrier can correspond to a system bandwidth of LTE system. In this case, the component carrier can have a bandwidth selected from the group including 1.25 MHz, 2.5 MHz, 5 MHz and 20 MHz.

In case that a whole system band is extended by carrier aggregation, a frequency band used for communication with each user equipment is defined by component carrier unit. A terminal A is able to use a whole system band 100 MHz and performs communication using 5 component carriers all. User equipments B1 to B5 are able to use a bandwidth 20 MHz only. And, each of the user equipments B1 to B5 performs communication using one component carrier. User equipment C1 and user equipment C2 can use a bandwidth 40 MHz. Each of the user equipment C1 and the user equipment C2 performs communication using 2 component carriers. In this case, these two component carriers may be logically/physically adjacent to each other or may not. The user equipment C1 represents a case of using two component carriers that are not adjacent to each other. And, the user equipment C2 represents a case that two adjacent component carriers are used.

Meanwhile, in case that carrier aggregation is applied, a base station and user equipments can be previously aware of component carriers that can be seen by each of the user equipments. Among these user equipments, there is one user equipment capable of seeing a single carrier or a preset number of carriers like LTE user equipment or another user equipment capable of seeing carriers of which number is less than that of the carriers supportable by the user equipment itself like the LTE-A user equipment. Thus, on the circumstance that the LTE user equipment and the LTE-A user equipment are mixed with each other, the LTE-A system needs to be operable without affecting the previous LTE user equipments.

In this case, it is most problematic how the control channels are actually operated. For instance, when channels including PCFICH, PHICH, PDCCH and the like exist as downlink control channels, as LTE and LTE-A user equipments are mixed with each other, LTE-A system us usable by designating different requirements, e.g., different transmission formats, different CCE aggregation levels or the like. In the following description, a method of allocating a resource for PDCCH transmission according to a transmission format or a CCE aggregation level is explained.

First Embodiment

Figure 11:
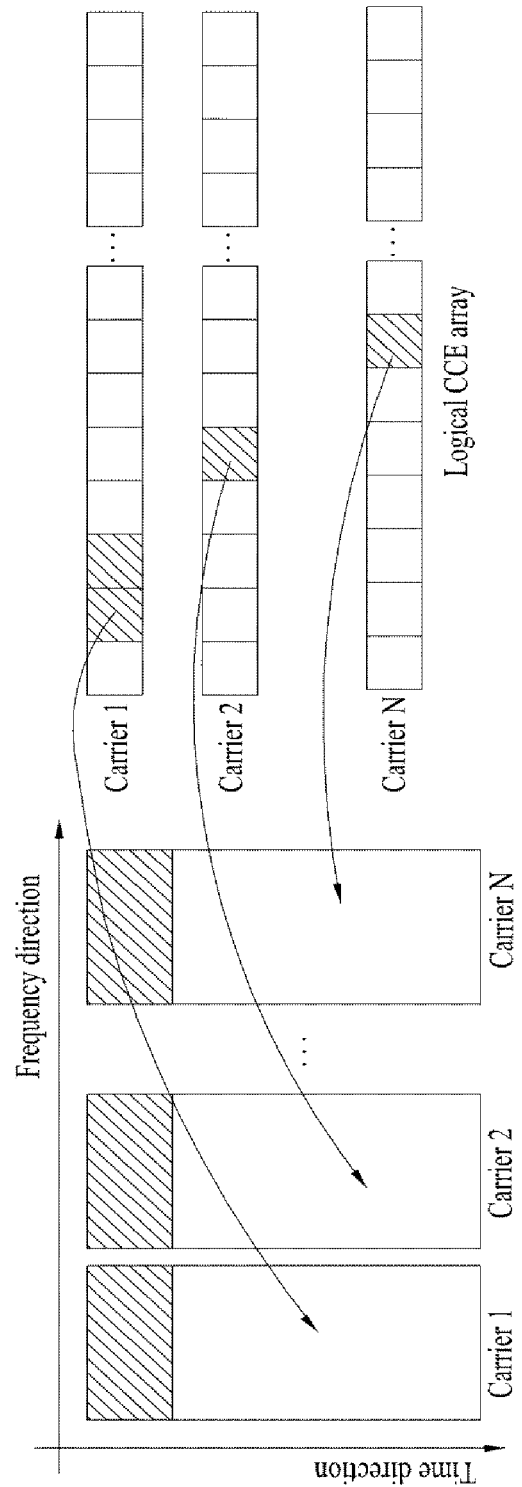
FIG. 11 is an exemplary diagram for a method of allocating a resource for control channel transmission according to a first embodiment of the present invention.

FIG. 11 is an exemplary diagram for a method of allocating a resource for control channel transmission according to a first embodiment of the present invention.

Referring to FIG. 11, in a method of allocating a resource for control channel transmission according to a first embodiment of the present invention, information included in PDCCH of one component carrier is configured in a format that names PDSCH within one component carrier. In this case, the PDSCH within the component carrier is a PDSCH of a component carrier of its own or a PDSCH of another component carrier.

In case that one LTE-A user equipment uses plural component carriers simultaneously, the LTE-A user equipment performs blind decoding on its search space at each PDCCH of the component carrier set for itself and then needs to find out resource allocation information on PDSCH. In this case, the blind decoding is to detect a corresponding control signal by performing decoding on a search space of PDCCH using all available CCE aggregation levels. And, its complexity considerably increases according to the number of component carriers. Thus, the demand for a method of reducing the complexity of the blind decoding rises. In the following description, proposed is a method for restricting a range, in which a search space can be located, or a CCE aggregation level or a method for restricting a total sum of a search space in each component carrier to remain constant.

First of all, a method for restricting a range enabling a search space to be located therein is explained. In order to restrict a range enabling a search space to be located therein, signaling is preferably performed by an upper layer before blind decoding. For instance, a base station restricts a range in which a search space applied to a random LTE-A user equipment can be located, and then enables the LTE-A user equipment to be aware of the restricted range through RRC signaling.

As a detailed method of restricting a range enabling a search space to be located therein, it is able to define a start position of a search space to be set uniform in each component carrier. If the start position is determined uniform according to each component carrier, it is advantageous in that a search space needs not to be independently searched for each component carrier. In order not to affect previous LTE user equipments, a parameter for a component carrier is preferably added to LTE-A user equipments. In particular, when several component carriers use the same user equipment ID, such a parameter as a component carrier index is usable for a search space start position calculating formula as well as a CCE aggregation level and a user equipment ID.

Moreover, by setting a reference CCE index to a start position of a search space, of which blind decoding is successful in a reference component carrier, and by adding a specific offset to a reference CCE index in other component carriers, it can be designated as a start position of a search space on which blind decoding will be performed.

Even if a start position of a search space is not set uniform, it is able to narrow a range of a search space by restricting the number of candidate PDCCH. For instance, if a CCE aggregation level of a search space decoded in a reference component carrier is 1 or 2, the number $M^{(L)}$ of candidate PDCCH in the reference component carrier is 6. In this case, it is able to restrict the number $M^{(L)}$ of the candidate PDCCH into one of $\{1, 2, 3, 4, 5\}$ smaller than 6 for other component carriers. For another instance, if a CCE aggregation level of a search space decoded in a reference component carrier is 4 or 8, the number $M^{(L)}$ of candidate PDCCH in the reference component carrier is 2. In this case, it is also able to restrict a search space range by restricting the number $M^{(L)}$ of the candidate PDCCH into one of $\{1\}$ smaller than 2.

In the following description, a method of restricting a CCE aggregation level is explained. First of all, a total number of search spaces in each component carrier is determined according to a CCE aggregation level of each component carrier. If a CCE aggregation level is set equal in each component carrier, the setting is performed by avoiding the collision between an operation of LTE user equipment and operation of LTE-A user equipment. Hence, although plural component carriers are used, it is preferable that a user equipment having the same ID should not exist among user equipments that use one component carrier. Therefore, the maximum number of user equipment IDs supportable by one component carrier is restricted.

Meanwhile, if a user equipment ID is set different for each component carrier, a total number of user equipment IDs available for one user equipment supportable in a situation of co-existence with LTE user equipment becomes dependent on the number of component carriers. Therefore, it is able to support more user equipments.

If each component carrier has a same CCE aggregation level, it is able to decrement a count for a corresponding user equipment to search at a different CCE aggregation level in a different component carrier. This can reduce overhead due to blind decoding. Yet, it may cause a problem that a resource of a quantity identical for every component carrier should exist in a search space. Therefore, it is able to set a CCE aggregation level having a relation uniform for each component carrier.

When one user equipment is scheduled on a plurality of component carriers to reduce blind decoding complexity by enabling a different CCE aggregation level to be designated to each component carrier, it is able to reduce the complexity in a manner that blind decoding is restricted to be performed on 2 or 3 adjacent CCE aggregation levels, e.g., $\{1, 2\}, \{2, 4\}, \{4, 8\}, \{1, 2, 4\}, \{2, 4, 8\}$, only.

In another method of restricting a CCE aggregation level, the same method of LTE user equipment, i.e., blind coding using all available CCE aggregation levels, is allowed for a reference component carrier and blind decoding is performed on the rest of component carriers using a specific CCE aggregation level adjacent to a CCE aggregation level detected from the reference component carrier.

Finally, since a total size of a search space has close relation with a count of performing blind decoding, it is able to consider a restriction method of maintaining a uniform total sum of a search space size on which blind decoding is actually performed in each component carrier.

In this case, by restricting a size of a search space per CCE aggregation level applied to each component carrier or allowing some of CCE aggregation levels only, it is able to implement a total sum of a search space in each component carrier to be maintained uniform.

Second Embodiment

Figure 12:
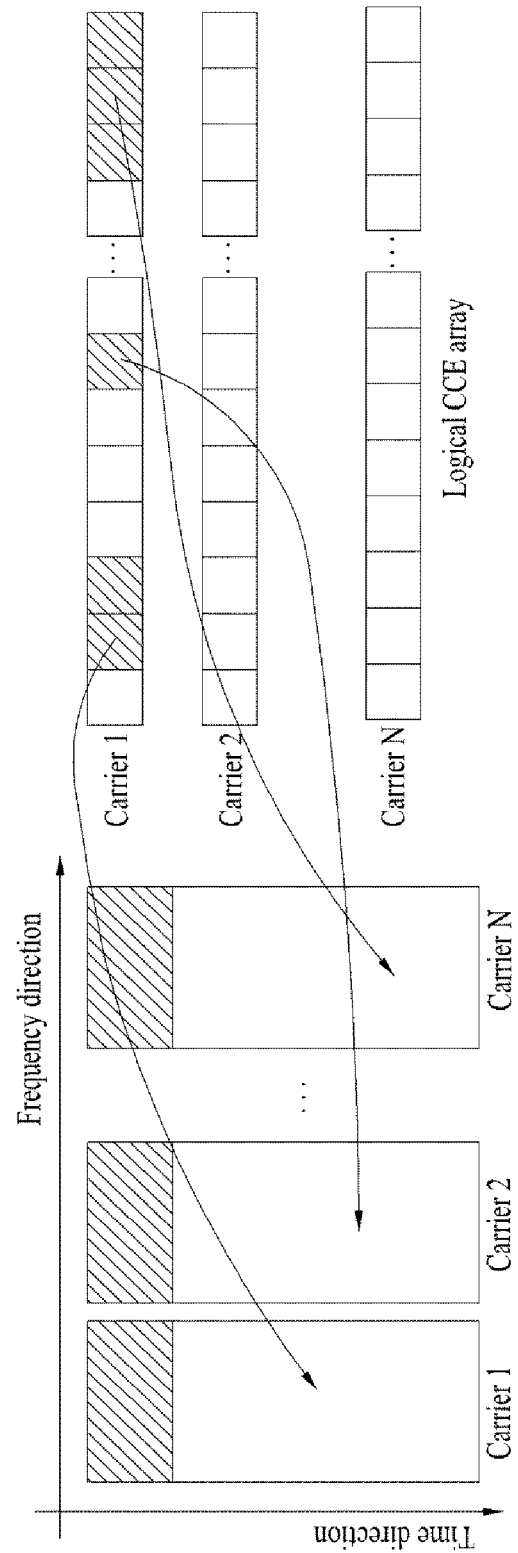
FIG. 12 is an exemplary diagram for a method of allocating a resource for control channel transmission according to a second embodiment of the present invention.

FIG. 12 is an exemplary diagram for a method of allocating a resource for control channel transmission according to a second embodiment of the present invention.

Referring to FIG. 12, a method of allocating a resource for control channel transmission according to a second embodiment of the present invention is configured in a manner that control channels for a plurality of component carriers are gathered into a control region of one component carrier and are then transmitted. Specifically, in case that separate coded control informations like the present embodiment are carried on a control region of one component carrier, it is able to set a component carrier carrying a control channel to differ for each user equipment for load balancing of all component carriers. For instance, using a calculation formula such as 'UE ID mod n' (where 'n' is a count of component carriers supportable according to a random user equipment, a count of candidate component carriers recognized by both a base station and a user equipment through signaling or other methods, etc.), it is able to determine a component carrier for carrying a control channel of a specific user equipment.

In case that control channels for a plurality of component carriers allocated to one user equipment are carried on one component carrier, a user equipment should search PDCCH of the one component carrier for a control channel relevant to itself and should be aware of a structure of mapping the control channels by a plurality of the component carriers. In order to implement this, a control channel can be configured in a manner of containing an ID or index of a component carrier or designating an order or position of a control channel according to a mapped component carrier.

First of all, a user equipment is able to obtain information on itself from PDCCH of each subframe based on its user equipment ID. In particular, as a start position of a search space is determined according to a predetermined rule determined from its user equipment ID, blind decoding is performed according to a given CCE aggregation level from the corresponding start position.

Meanwhile, in previous LTE, it may happen that resources are in short if control channels for a plurality of component carriers are collectively carried on a control region of one component carrier. Therefore, a second embodiment of the present invention proposes a scheme of extending a search space. This scheme of extending a range of a search space is preferably signaled by an upper layer. For instance, a base station extends a range of a search space applied to a random LTE-A user equipment and then enables the LTE-A user equipment to recognize the extended range through RRC signaling.

Figure 13:
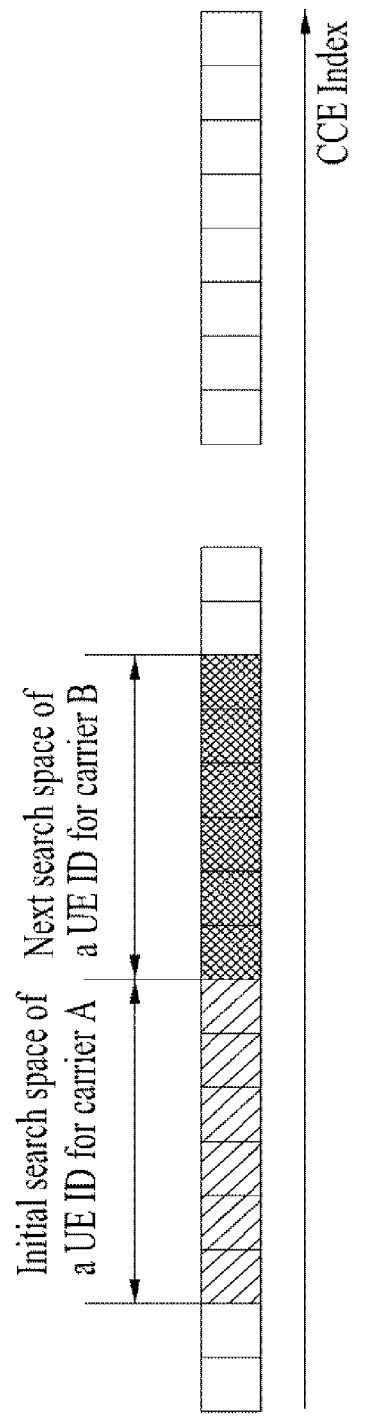
FIG. 13 and FIG. 14 are exemplary diagrams for a scheme of extending a search space according to an embodiment of the present invention.
Figure 14:
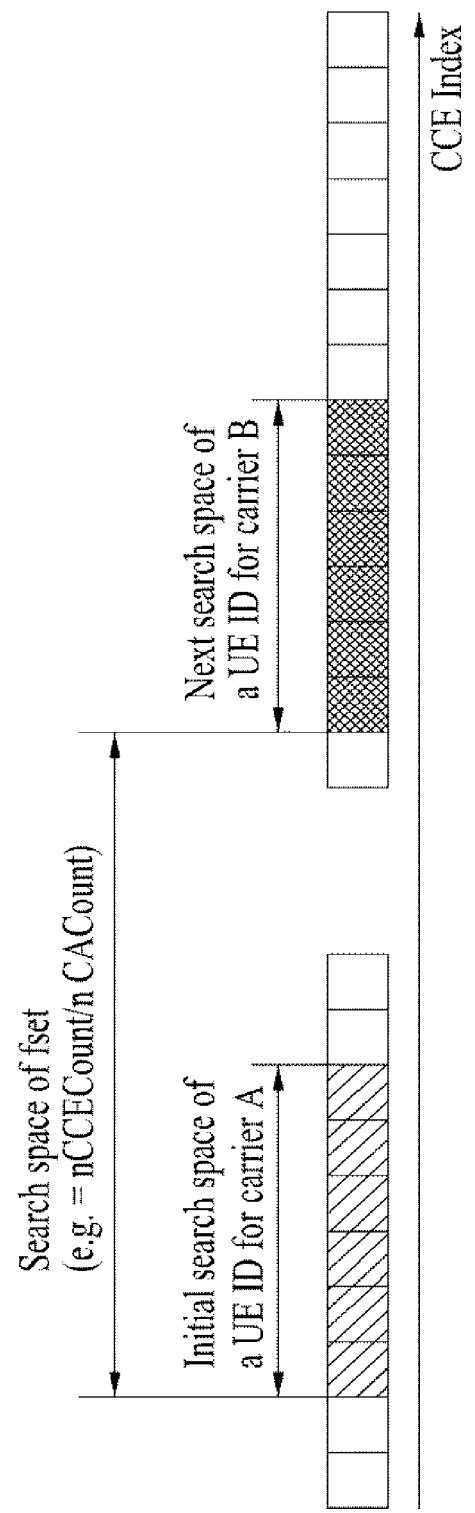

FIG. 13 and FIG. 14 are exemplary diagrams for a scheme of extending a search space according to an embodiment of the present invention.

Specifically, FIG. 13 exemplarily shows a scheme of simply extending a currently defined search space according to the number of component carriers used by a corresponding user equipment. And, FIG. 14 exemplarily shows a scheme of extending a search space in a manner that a predetermined search space offset, e.g., a numeral resulting from dividing a total count of CCEs by a total count of component carriers is applied as a search space offset.

In this case, the search space offset may vary for each user equipment according to a count (nCACount) of aggregated component carriers. Yet, it is also able to designate a UE-specific random search space offset. Although a CCE aggregation level for each search space can be set different, it can be set to an identical value or a value in a predetermined relation in order to reduce blind decoding complexity.

As another scheme of extending a search space, it is able to consider a scheme of uniformly extending a size of a search space according to each CCE aggregation level disclosed in Table 1 or a scheme of extending a search space at a high CCE aggregation level only. Moreover, a value for extending a search space can be set different for each CCE aggregation level. In case that a search space is extended different for each CCE aggregation level, it is able to consider a case that at least one or more CCE aggregation levels are excluded from the search space.

Meanwhile, as a search space is extended, complexity of blind decoding may increase. As a scheme of reducing the blind decoding complexity, it a start point of a search space is set to be located at a predetermined CCE index according to a control channel corresponding to each component carrier, it is advantageous in that each search space for each component carrier needs not to be separately calculated. For this, it is able to configure a start point of a search space for each component carrier by setting a calculation formula for generating a start point of a search space in a manner that an input variable is set to relative or absolute values of component carrier indexes set in a user equipment or a value of an order of component carrier indexes.

Third Embodiment

Figure 15:
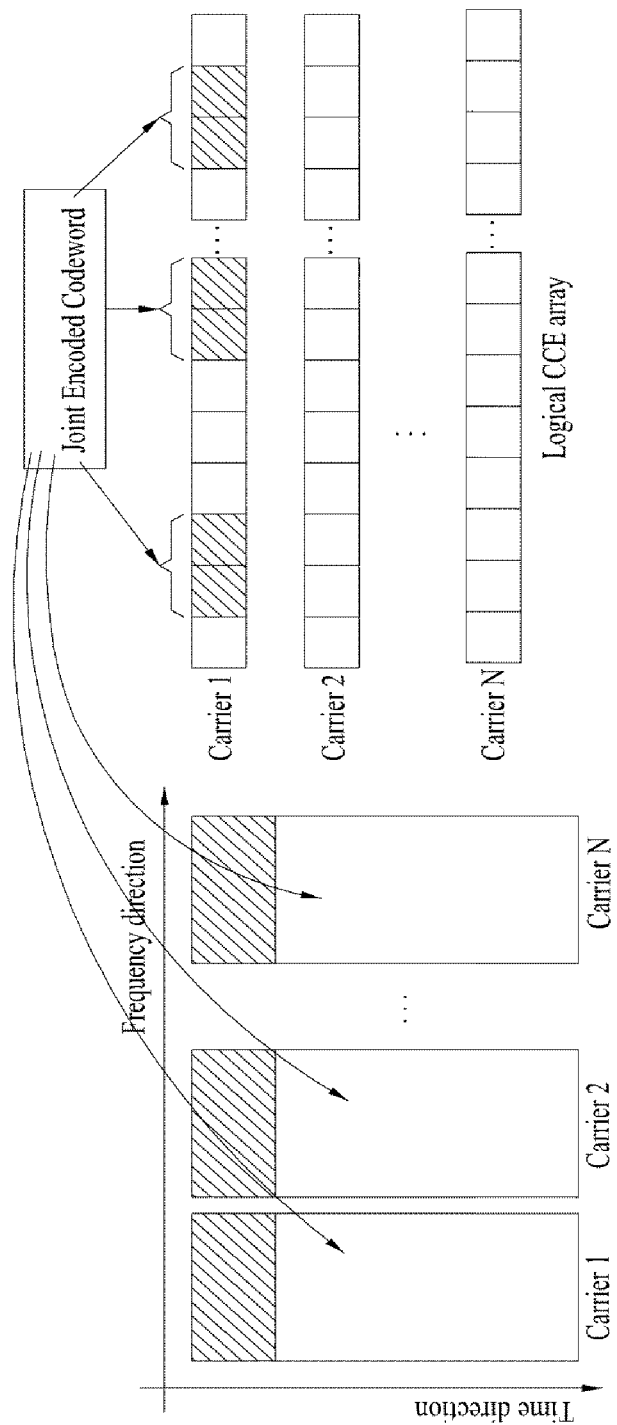
FIG. 15 is an exemplary diagram for a method of allocating a resource for control channel transmission according to a third embodiment of the present invention.

FIG. 15 is an exemplary diagram for a method of allocating a resource for control channel transmission according to a third embodiment of the present invention.

Referring to FIG. 15, in a method of allocating a resource for control channel transmission according to a third embodiment of the present invention, informations on a plurality of component carriers are joint-coded and then gathered into one component carrier to be carried thereon. In case that a control channel is transmitted for each component carrier, a resource may be wasted due to additional overhead such as a CRC check bit addition per individual control channel and the like. Besides, if several informations are gathered once and then transmitted, it is able to obtain a greater coding gain due to a length difference of codeword about each information. In this case, the codeword may include one codeword. Alternatively, the codeword can be transmitted by being formed in a manner that a plurality of codewords are consecutively connected to each another. Alternatively, the codeword can be transmitted in a manner of being defined per layer in MIMO (multiple-input multiple-output) mode.

If a join coded control channel is carried on one component carrier, it is able to set a component carrier carrying the control channel to differ for each user equipment for load balancing of whole component carriers. For instance, using a calculation formula such as 'UE ID mod n' (where 'n' is a count of component carriers supportable according to a random user equipment, a count of candidate component carriers recognized by both a base station and a user equipment through signaling or other methods, etc.), it is able to determine a component carrier for carrying a control channel of a specific user equipment.

The joint coded codeword(s) is carried on one component carrier by having a resource allocated thereto. The allocated resource may differ in its structure according to a search space of each user equipment. Since LTE-A user equipment requires resources more than those of a previous LTE user equipment, it may require CCE aggregation levels more than those of the LTE user equipment. Therefore, it is able to consider a level (e.g., 6, 10, 12, 16, 32, etc.) other than 1, 2, 4 and 8 as a CCE aggregation level (L). A count of candidate PDCCH to be monitored in a search space can be defined into at least two spaces for a case that a CCE aggregation level (L) is equal to or greater than 8. And, it is able to separately define a size of a search space per the above-added CCE aggregation level.

If the extended CCE resource is consecutively used, limitation may be put on a case that user equipments having different IDs use the search space. To prevent this, it is able to set a corresponding CCE resource in a multi-space by dividing the corresponding CCE resource into a random number instead of defining the corresponding CCE resource for one continuous space. For instance, although a search space is constructed with 6 CCEs, if a CCE aggregation level for performing blind decoding is equal to or greater than 8, CCE resources may be used more than those for one search space. Therefore, limitation may be put on a case hat another user equipment is scheduled and then transmits a grant signal to a cell. To prevent this, it is able to consider a scheme of configuring extended CCE resources in a manner of grouping the extended CCE resources by a random CCE count unit equal to or greater than 1 and then spreading them into a whole CCE space.

Fourth Embodiment

Figure 16:
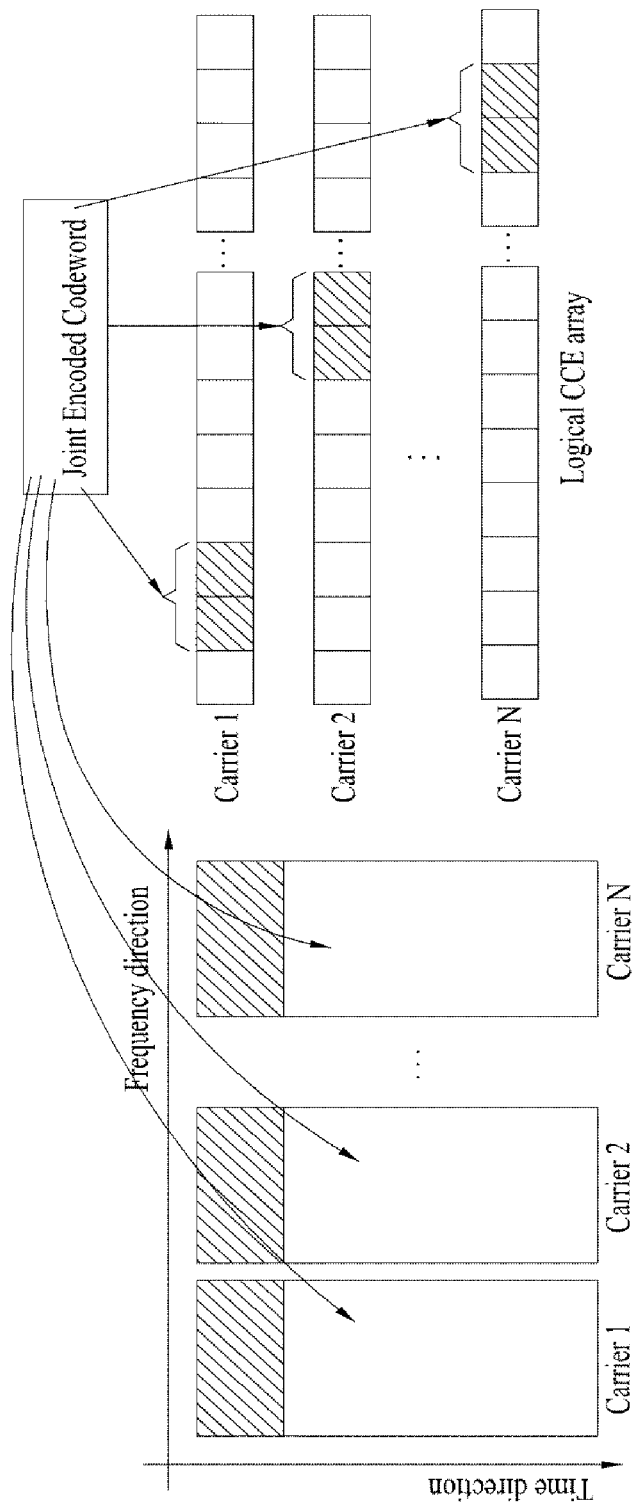
FIG. 16 is an exemplary diagram for a method of allocating a resource for control channel transmission according to a fourth embodiment of the present invention.

FIG. 16 is an exemplary diagram for a method of allocating a resource for control channel transmission according to a fourth embodiment of the present invention.

Referring to FIG. 16, in a method of allocating a resource for control channel transmission according to a fourth embodiment of the present invention, informations on a plurality of component carriers are joint-coded, divided into a plurality of component carriers and then transmitted. A portion of a control channel is carried on each component carrier. And, a user equipment should perform decoding on a corresponding search space by combining the above allocated resources together.

In allocating the resources in the above manner, resource division is equivalently performed on different component carriers. And, a structure for a user equipment to search the corresponding resources is necessary. For this, in transmitting the joint coded control information, a transmission resource is properly distributed on each component carrier but avoids affecting an operation of a previous LT user equipment. As a scheme for this, the following methods can be taken into consideration.

Firstly, there is a scheme of utilizing a resource allocating method in previous LTE.

In reutilizing a resource, user equipment ID in each component carrier may be identical or different, which depends on how a user equipment ID is managed in a cell. Hence, a search space in each component carrier is determined according to a user equipment ID given to each user equipment. Even if a bandwidth of each component carrier differs, a definition of a search space is identical. Therefore, a search space is determined according to a predetermined rule. Yet, in consideration of blind decoding complexity, it is able to set a CCE aggregation level to a uniform value per component carrier. And, it is also able to set whether to perform decoding at a same start point per component carrier. The decoding blind complexity may vary according to whether a start point is identical per component carrier, which can be set by a base station.

Meanwhile, when the joint coded control channel is divided per component carrier, it is able to consider a scheme of dividing the joint coded control cannel be a previous CCE aggregation level unit. Moreover, it is able to set the divided control channel to be located in a search space having a lowest CCE aggregation level among CCE aggregation levels greater than a CCE count for the divided control channel.

Secondly, there is a scheme of reconfiguring a search space. A search space basically discovers a CCE index based on a user equipment ID and is configured to set the point to a start. If carrier aggregation is further applied thereto, a parameter relevant to a component carrier can be further added. In particular, it is necessary to define whether to set mapping to a prescribed component carrier to a start point.

Figure 17:
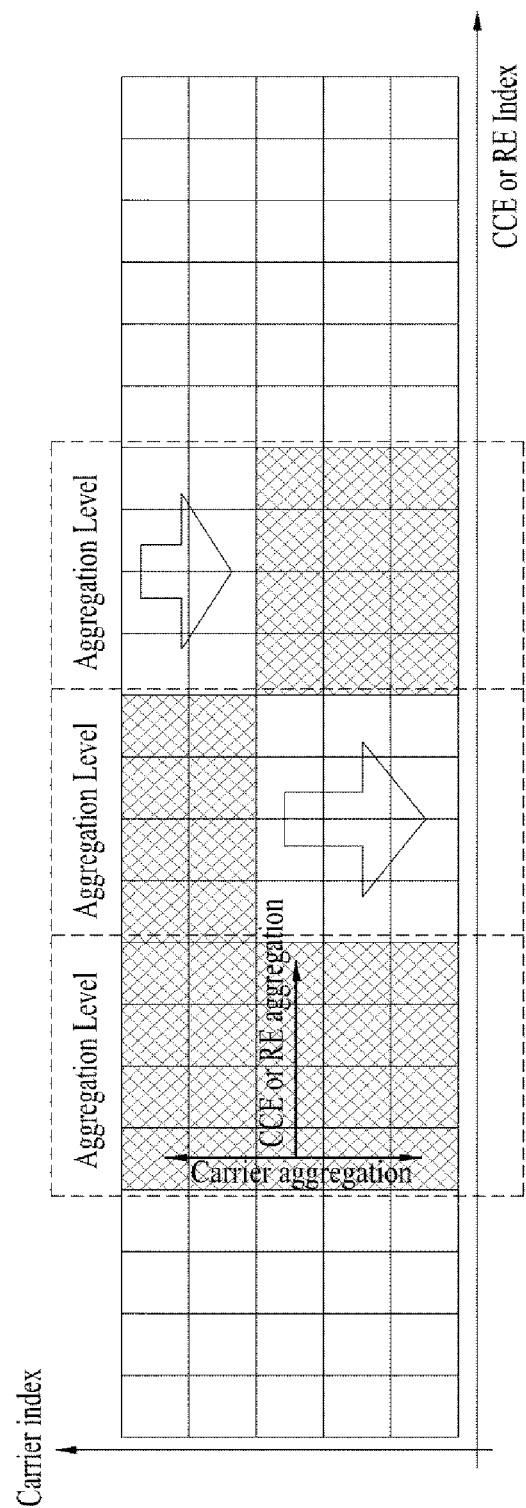
FIG. 17 is an exemplary diagram for reconfiguration of a search space according to a fourth embodiment of the present invention.

FIG. 17 is an exemplary diagram for reconfiguration of a search space according to a fourth embodiment of the present invention.

Referring to FIG. 17, it is able to consider a scheme of setting a reference component carrier among whole component carriers for each user equipment and mapping a control channel resource from the reference component carrier. In case that a reference component carrier is not separately defined, a user equipment searches a CCE index per component carrier and then sequentially selects a CCE in an increasing or decreasing direction of a frequency index for the whole component carriers allocated to the corresponding user equipment.

Thus, in the scheme of defining one reference search space and defining a search space adjacent to the reference search space, a search space can be defined in a manner of shifting a carrier index corresponding to the reference search space, being located right behind the reference search space or being located according to a predetermined offset for the reference search space.

Figure 19:
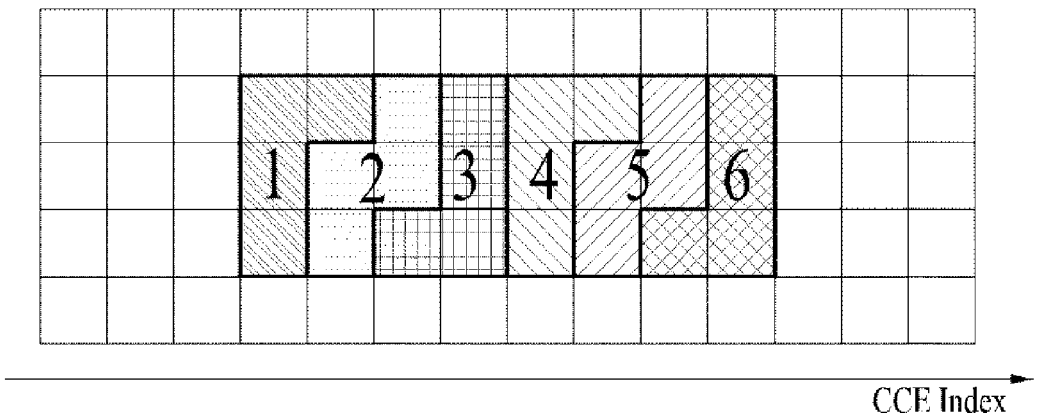
FIG. 19 is an exemplary diagram of a search pace according to a fourth embodiment of the present invention if a count of CCEs used for each component carrier is different.
Figure 20:
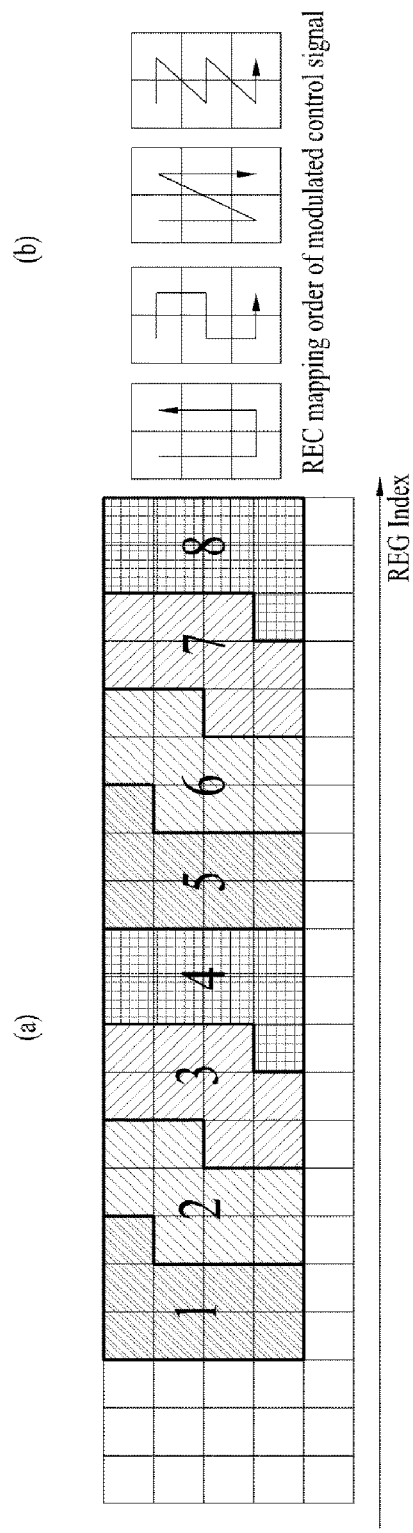
FIG. 20 is an exemplary diagram for a case that a resource for transmitting a control channel is configured by REG unit.

The higher a CCE aggregation level gets, the more the quantity of resources required for one search in a search space increases and the larger a size of a securable search space increases. So, it may become difficult to allocate a control channel. Therefore, it is necessary to subdivide a search space exemplarily shown in FIG. 18. FIG. 19 and FIG. 20 are exemplary diagrams for subdividing the search space shown in FIG. 18.

Figure 18:
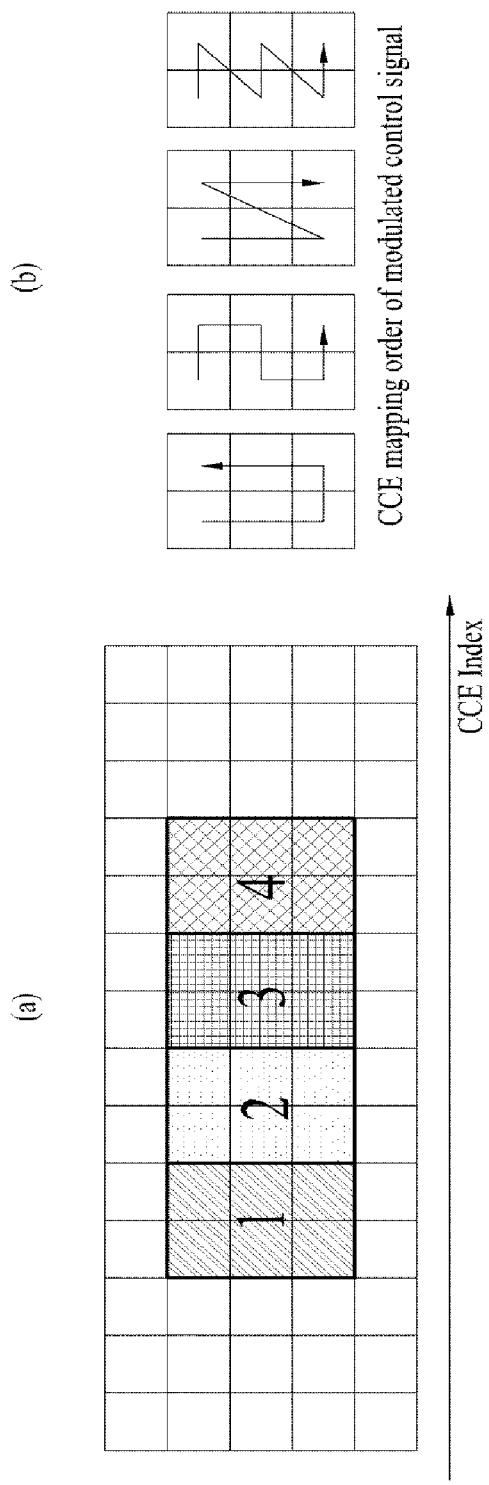
FIG. 18 is an exemplary diagram of a search pace according to a fourth embodiment of the present invention if a count of CCEs used for each component carrier is identical.

FIG. 18 is an exemplary diagram of a search pace according to a fourth embodiment of the present invention if a count of CCEs used for each component carrier is identical. For a size of a search space, a count of CCEs is calculated on a carrier index axis to be suitable for total CCE aggregation levels at an end point of one search space. CCE is selected within component carriers set for a corresponding user equipment only. If CCEs are completely consumed at a first position of a search space in each component carrier, CCE is selected in a carrier index direction at a second position of a search space within a next component carrier.

FIG. 18 (b) exemplarily shows an order of mapping a control signal by a selected CCE. For instance, it can be implemented in a following scheme. First of all, a control signal is mapped in a specific component carrier (e.g., a component carrier having a lowest or highest index, a reference component carrier previously set for a UE, etc.). Secondly, a CCE index is then incremented. For another instance, it is able to consider a scheme of performing mapping on a specific component carrier in a CCE index direction and then a incrementing or decrementing a carrier index.

FIG. 19 exemplarily shows a search pace if a count of CCEs used for each component carrier is different. In case that 3 component carriers allocated to a user equipment and 4 CCEs are set, it is able to select two CCEs from a specific component carrier. In this case, a CCE is selected on a carrier index axis and a CCE is then selected by incrementing a next CCE index. Moreover, a size of a search space is preferably set to a multiple of 'count of whole component carriers*count of CCE aggregation levels (nCarrierAggregated*nCCEAggregationLevel)'. Otherwise, it may be disadvantageous in that utility for the rest of CCEs after allocation to a search space is reduced.

FIG. 18 and FIG. 9 exemplarily show the case that three component carriers are allocated to a user equipment. And, it is apparent to those skilled in the art that the principles shown in FIG. 18 and FIG. 19 are applicable to other component carrier counts/

Meanwhile, if a count of CCEs set for each component carrier varies, i.e., a value of PCFICH or a count of PHICH varies or a bandwidth of each component carrier varies, the above described CCE index is changed into a CCE search index and the CCE search index is applicable in the same manner. In particular, a start position of a CCE selected from one component carrier is determined based on an ID of each user equipment. It is then able to implement a search space, as shown in FIG. 19 or FIG. 20, based on the start position selected for each component carrier. Namely, based on a start position of a CCE available per component carrier for each user equipment, it is able to designate a start position for resource allocation.

If a count of CCEs to use in transmitting a control channel is different from that of component carriers, it may happen that a physical resource carrying a control channel is not selected from a specific carrier. In this case, in selecting a resource per component carrier, it is able to consider a case of selecting a resource by a unit of REG or RE instead of CCE unit.

FIG. 20 is an exemplary diagram for a case that a resource for transmitting a control channel is configured by REG unit.

In case of constructing a CCE for control channel transmission across a plurality o component carriers by unit of REG or RE, definition of a search space can be set in various ways. In case that an REG/RE count is identical in each component carrier, a start position of a search space in every component carrier is applicable in common.

On the contrary, if an REG/RE count is different in each component carrier, a search space is set for each component carrier. It is then able to set a start position of CCE aggregation in a corresponding component carrier to a start position of a corresponding REG/RE.

According to the above described embodiments, in a carrier aggregation implemented wireless communication system, a cell is facilitated to configure PDCCH and is then able to allocate a control signal. And, a user equipment can bring an effect of reducing a blind decoding count. Moreover, it is able to obtain an additional frequency diversity effect by configuring a control channel for multiple component carrier.

Figure 21:
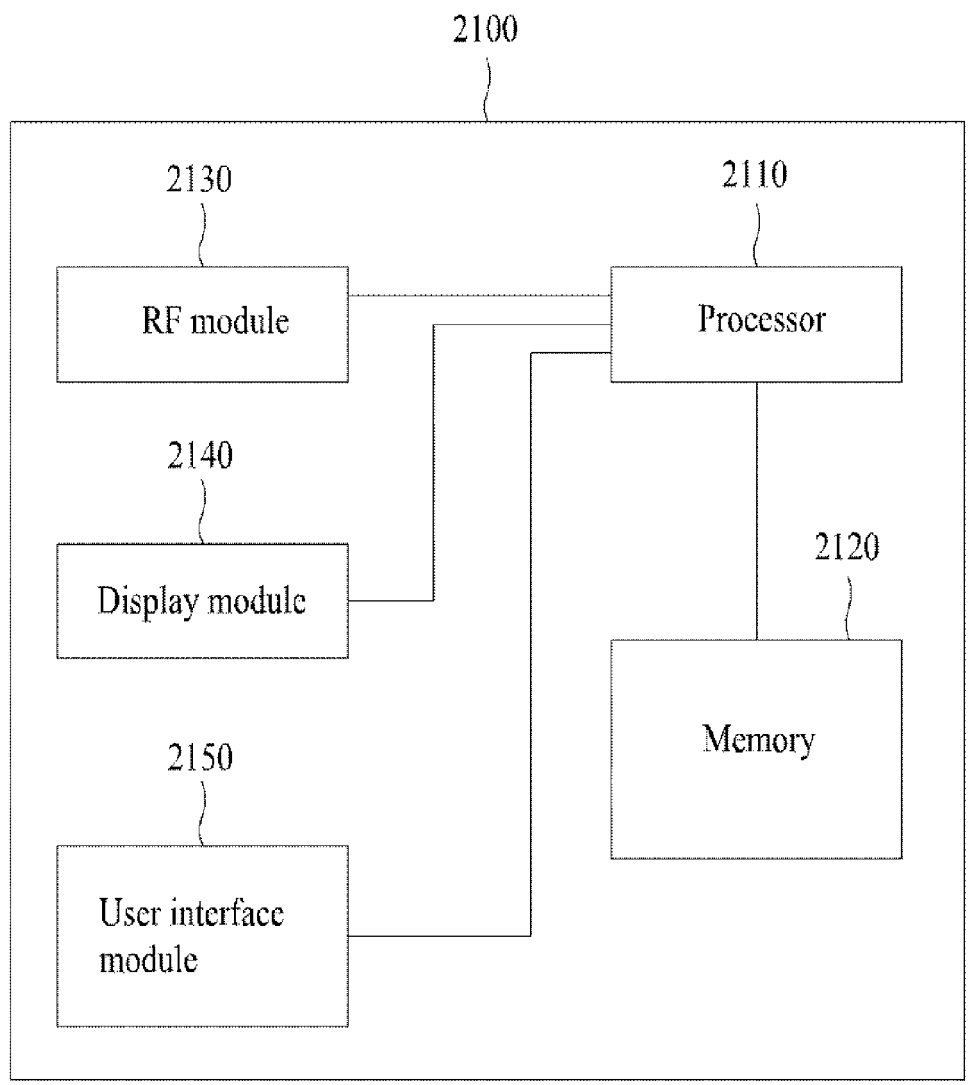
FIG. 21 is a block diagram of a communication transceiver according to one embodiment of the present invention.

FIG. 21 is a block diagram of a communication transceiver according to one embodiment of the present invention, in which a transceiver can include a base station or a user equipment in part.

Referring to FIG. 21, a transceiver 2100 includes a processor 2110 a memory 2120, an RF module 2130, a display module 2140 and a user interface module 2150.

The transceiver 2100 is shown for clarity and convenience of the following description. And, some modules can be omitted from the transceiver 2100 shown in the drawing. Optionally, the transceiver 2100 is able to further include necessary module(s). And, some modules of the transceiver 2100 can be divided into submodules. The processor 2120 is configured to perform an operation according to an embodiment of the present invention exemplarily shown with reference to the drawing. In particular, in case that the transceiver 2100 is a part of a base station, the processor 2120 is able to perform a function of generating a control signal and mapping the generated control signal by a control channel established within a plurality of component carriers. In case that the transceiver 2100 is a part of a user equipment, the processor 2120 checks a control channel directed to itself from signals received from a plurality of component carriers and is then able to extract a control signal from the checked control channel.

Subsequently, the processor 2120 is able to perform a necessary operation based on the control signal. Detailed operations of the processor 2120 can refer to the contents described with reference to FIGS. 1 to 21.

The memory 2120 is connected to the processor 2110 and stores an operating system, applications, program codes, data and the like. The RF module 2130 is connected to the processor 2110 and performs a function of converting a baseband signal to a radio signal or converting a radio signal to a baseband signal. For this, the RF module 2130 performs analog conversion, amplification, filtering and frequency uplink transform or inverse processes thereof. The display module 2140 is connected to the processor 2110 and displays various kinds of informations, by which the present invention is non-limited. The display module 2140 can include such a well-known element as LCD (Liquid Crystal Display), LED (Light Emitting Diode), OLED (Organic Light Emitting Diode) and the like. The user interface module 2150 is connected to the processor 2110 and can include a combination of well-known interfaces including a keypad, a touchscreen and the like.

The above described embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

In this disclosure, embodiments of the present invention are described centering on the data transmission/reception relations between a terminal and a base station. In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other networks except the base station. In this case, 'base station' can be replaced by such a terminology as a fixed station, a Node B, an eNode B (eNB), an access point and the like. And, 'terminal' can be replaced by such a terminology as a user equipment (UE), a mobile station (MS), a mobile subscriber station (MSS)' and the like.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

INDUSTRIAL APPLICABILITY

Accordingly, the present invention is applicable to a wireless communication system. More particularly, the present invention is applicable to a method and apparatus for transmitting a control signal from a base station in a carrier aggregation applied wireless communication system.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method of detecting a control channel by a user equipment in a wireless communication system supporting carrier aggregation, the method comprising
receiving control regions including the control channel relevant to each of a plurality of component carriers via the plurality of component carriers; and
detecting the control channel related to the user equipment in a search space included in the control regions,
wherein the control channel is detected by blind decoding by a unit of control channel element (CCE) aggregated at a preset level, and
wherein the blind decoding is performed for the rest of the plurality of component carriers except a reference component carrier using a search space having a size smaller than that of a search space successfully decoded for the reference component carrier,
wherein a start position of the search space is set by a certain scheme according to the plurality of component carriers; and
wherein the preset level is identically set for each of the plurality of component carriers.

2. A method of detecting control channels by a user equipment in a wireless communication system supporting carrier aggregation, the method comprising:
receiving a control region including control channels respectively relevant to a plurality of component carriers via one of the plurality of component carriers; and
detecting the control channel related to the user equipment in an extended search space included in the control regions,
wherein the control channel is detected by blind decoding by a unit of CCH (control channel element) aggregated at a preset level, and
wherein the blind decoding is performed for the rest of the plurality of component carriers except a reference component carrier using an extended search space having a size smaller than that of an extended search space successfully decoded for the reference component carrier,
wherein the extended search space is formed by extending a size of a search space in a legacy system; and
the extended search space differs in size per corresponding aggregation level.

3. A user equipment, which performs communication using a plurality of component carriers in a wireless communication system supporting carrier aggregation, the user equipment comprising:
a radio frequency (RF) module configured to transmit or receive a signal via the plurality of component carriers; and
a processor configured to process the signal received from the RF module,
wherein the RF module is further configured to receive control regions including a control channel relevant to each the plurality of component carriers via the plurality of component carriers; and
wherein the processor is further configured to detect the control channel related to the user equipment in a search space included in the control regions,
wherein the control channel is detected by blind decoding by a unit of CCH (control channel element) aggregated at a preset level, and
wherein the blind decoding is performed for the rest of the plurality of component carriers except a reference component carrier using a search space having a size smaller than that of a search space successfully decoded for the reference component carrier;
wherein a start position of the search space is set by a certain scheme according to the plurality of component carriers; and
wherein the preset level is identically set for each of the plurality of component carriers.

4. A user equipment, which performs communication using a plurality of component carriers in a wireless communication system supporting carrier aggregation, the user equipment comprising:
a radio frequency (RF) module configured to transmit or receive a signal via the plurality of component carriers; and
a processor configured to process the signal received from the RF module, wherein the RF module is further configured to receive a control region including control channels respectively relevant to the plurality of component carriers via one of the plurality of component carriers, and
wherein the processor is further configured to detect the control channel related to the user equipment in an extended search space included in the control regions,
wherein the control channel is detected by blind decoding by a unit of CCH (control channel element) aggregated at a preset level, and
wherein the blind decoding is performed for the rest of the plurality of component carriers except a reference component carrier using an extended search space having a size smaller than that of an extended search space successfully decoded for the reference component carrier;
wherein a start position of the search space is set by a certain scheme according to the plurality of component carriers; and
wherein the preset level is identically set for each of the plurality of component carriers.

* * * * *

UNITED STATES PATENT AND TRADEMARK OFFICE
CERTIFICATE OF CORRECTION

| | | |
|---|---|---|
| PATENT NO. | : 8,463,262 B2 | Page 1 of 1 |
| APPLICATION NO. | : 13/123988 | |
| DATED | : June 11, 2013 | |
| INVENTOR(S) | : Yeong Hyeon Kwon et al. | |

It is certified that error appears in the above-identified patent and that said Letters Patent is hereby corrected as shown below:

On the Title Page

Please correct the title page of the patent to include the following information:

Related U.S. Application Data
Item (60) Provisional application No.: 61/119,733, filed on Dec. 4, 2008.

Signed and Sealed this
Twenty-fifth Day of February, 2014

Michelle K. Lee
*Deputy Director of the United States Patent and Trademark Office*